(12) United States Patent
Kavli et al.

(10) Patent No.: US 9,733,720 B2
(45) Date of Patent: Aug. 15, 2017

(54) ULTRASONIC PROXIMITY AND MOVEMENT DETECTION

(71) Applicant: Elliptic Laboratories AS, Oslo (NO)

(72) Inventors: Tom Kavli, Nittedal (NO); Thomas Børstad, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 73 days.

(21) Appl. No.: 14/954,288

(22) Filed: Nov. 30, 2015

(65) Prior Publication Data
US 2016/0154535 A1   Jun. 2, 2016

(30) Foreign Application Priority Data

Dec. 2, 2014   (GB) .................................. 1421427.4

(51) Int. Cl.
| | | |
|---|---|---|
| *G06F 3/01* | (2006.01) | |
| *G06F 3/041* | (2006.01) | |
| *G06F 1/32* | (2006.01) | |
| *G06F 3/038* | (2013.01) | |
| *G09G 5/00* | (2006.01) | |

(52) U.S. Cl.
CPC ............ *G06F 3/017* (2013.01); *G06F 1/3231* (2013.01); *G06F 3/038* (2013.01); *G06F 3/0416* (2013.01); *G06F 2203/04101* (2013.01); *G09G 5/00* (2013.01); *G09G 2320/0626* (2013.01); *G09G 2354/00* (2013.01)

(58) Field of Classification Search
CPC ......... G06F 1/3231; G06F 2203/04101; G06F 3/017; G06F 3/038; G06F 3/0416; G09G 2320/0626; G09G 2354/00; G09G 5/00
See application file for complete search history.

(56) References Cited

U.S. PATENT DOCUMENTS

| | | | |
|---|---|---|---|
| 6,741,237 B1 * | 5/2004 | Benard ................. | G06F 3/0436 178/18.01 |
| 2012/0206339 A1 * | 8/2012 | Dahl ....................... | G06F 3/043 345/156 |
| 2013/0114380 A1 * | 5/2013 | Bryger .................... | G06F 3/017 367/199 |

(Continued)

FOREIGN PATENT DOCUMENTS

| | | |
|---|---|---|
| WO | WO 2006/067436 | 6/2006 |
| WO | WO 2009/115799 | 9/2009 |

(Continued)

*Primary Examiner* — Dmitriy Bolotin
(74) *Attorney, Agent, or Firm* — Beyer Law Group LLP

(57) ABSTRACT

An electronic device comprises an ultrasound transmitter, an ultrasound receiver, a display screen, and a processing system. It transmits ultrasonic signals from the ultrasound transmitter and receives ultrasound signals, through air, at the ultrasound receiver. It uses signals transmitted by the ultrasound transmitter and received at the ultrasound receiver to determine, at intervals, whether or not an object is present within a three-dimensional detection zone adjacent the device, by determining whether or not a set of presence conditions is met. It alters the display screen when the results of two successive such determinations differ. It also uses signals transmitted by the ultrasound transmitter and received at the ultrasound receiver to detect a movement of an input object, and control a further operation of the device in response to said detection.

20 Claims, 2 Drawing Sheets

(56) References Cited

U.S. PATENT DOCUMENTS

2015/0293599 A1* 10/2015 Shih .................... G06F 3/04847
                                                    345/173
2016/0154535 A1*  6/2016 Kavli ................... G06F 1/3231
                                                    345/177

FOREIGN PATENT DOCUMENTS

| WO | WO 2009/122193 | 10/2009 |
|----|----------------|---------|
| WO | WO 2009/147398 | 12/2009 |
| WO | WO 2010/026395 |  3/2010 |
| WO | WO 2011/004135 |  1/2011 |
| WO | WO 2011/036486 |  3/2011 |
| WO | WO 2011/042748 |  4/2011 |
| WO | WO 2011/042749 |  4/2011 |
| WO | WO 2011/048433 |  4/2011 |
| WO | WO 2012/001412 |  1/2012 |
| WO | WO 2012/017241 |  2/2012 |
| WO | WO 2012/022979 |  2/2012 |
| WO | WO 2012/080752 |  6/2012 |
| WO | WO 2012/131355 | 10/2012 |
| WO | WO 2012/131359 | 10/2012 |
| WO | WO 2012/172322 | 12/2012 |
| WO | WO 2013/045938 |  4/2013 |
| WO | WO 2013/132241 |  9/2013 |
| WO | WO 2013/132242 |  9/2013 |
| WO | WO 2013/132244 |  9/2013 |
| WO | WO 2013/140130 |  9/2013 |
| WO | WO 2014/013249 |  1/2014 |
| WO | WO 2014/125294 |  8/2014 |

* cited by examiner

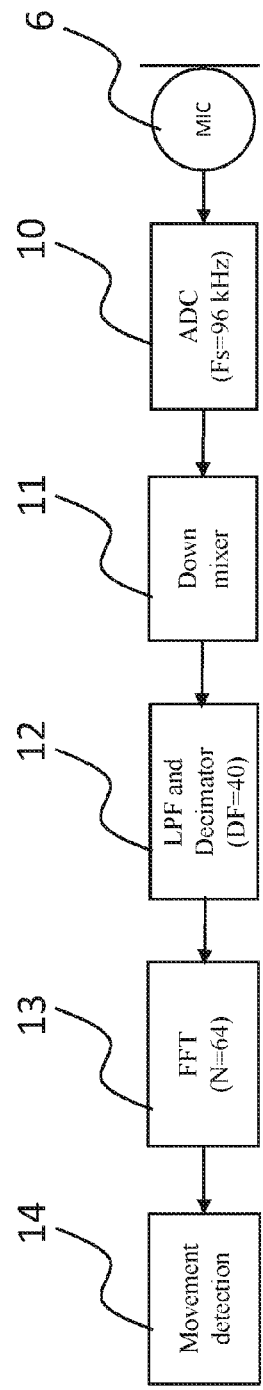
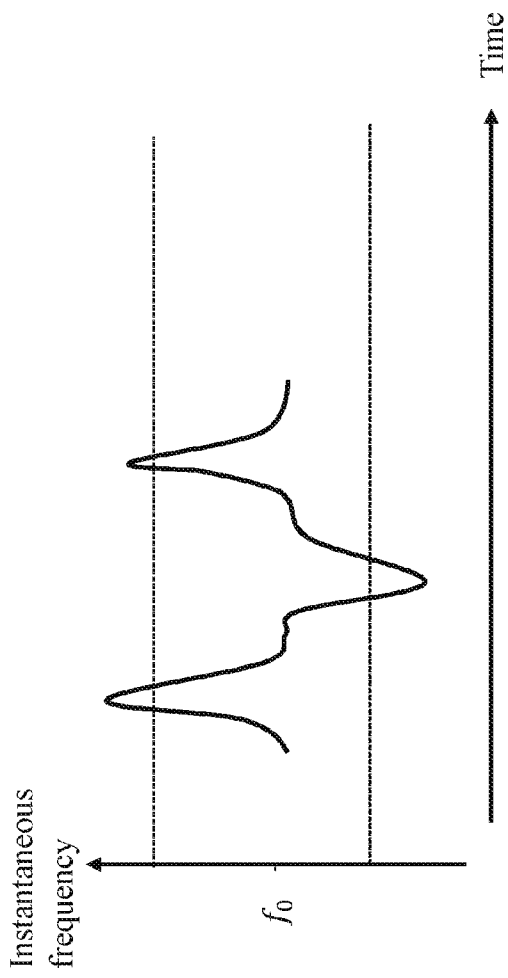
Fig. 2
Fig. 3

ULTRASONIC PROXIMITY AND MOVEMENT DETECTION

CROSS-REFERENCE TO RELATED APPLICATIONS

This Application claims priority to GB Application No. 1421427.4, filed Dec. 2, 2014, which is incorporated herein in its entirety for all purposes.

This invention relates to the control of electronic devices through the use of signals, particularly ultrasonic signals, reflected from an object such as a human hand.

It is known to support touchless interaction with electronic devices by transmitting ultrasonic signals through air, receiving reflections of the signals off an input object, such as a human hand, and processing the received signals to determine information about the position or movement of the input object.

Various such approaches are described in the applicant's earlier patent applications, including WO2006/067436, WO2009/115799, WO2009/122193, WO2009/147398, WO2010/026395, WO2011/004135, WO2011/036486, WO2011/042748, WO2011/042749, WO2011/048433, WO2012/001412, WO2012/017241, WO2012/022979, WO2012/080752, WO2012/131355, WO2012/131359, WO2012/172322, WO2013/045938, WO2013/132241, WO2013/132242, WO2013/132244, WO2013/140130, WO2014/013249 and WO2014/125294, the contents of which are hereby incorporated by reference.

However, such processing is often complex and power hungry, which is disadvantageous, especially on battery-powered devices. Moreover, the ultrasound transducers can be expensive and unsightly.

The present invention seeks to provide a simpler, more efficient approach.

From one aspect, the invention provides an electronic device comprising an ultrasound transmitter, an ultrasound receiver, a display screen, and a processing system, wherein the device is configured to:

transmit ultrasonic signals from the ultrasound transmitter;

receive ultrasound signals, through air, at the ultrasound receiver;

use signals transmitted by the ultrasound transmitter and received at the ultrasound receiver to determine, at intervals, whether or not an object is present within a three-dimensional detection zone adjacent the device, by determining whether or not a set of presence conditions is met;

alter the display screen when the results of two successive such determinations differ; and use signals transmitted by the ultrasound transmitter and received at the ultrasound receiver to detect a movement of an input object, and control a further operation of the device in response to said detection.

From a second aspect, the invention provides a method comprising:

transmitting ultrasonic signals from an ultrasound transmitter;

receiving ultrasound signals, through air, at an ultrasound receiver;

using signals transmitted by the ultrasound transmitter and received at the ultrasound receiver to determine, at intervals, whether or not an object is present within a three-dimensional detection zone, by determining whether or not a set of presence conditions is met;

altering a display screen when the results of two successive such determinations differ; and using signals transmitted by the ultrasound transmitter and received at the ultrasound receiver to detect a movement of an input object, and performing a further operation in response to said detection.

From a third aspect, the invention provides computer software, and a carrier or memory bearing the same, which, when executing on a processing system in an electronic device, causes the processing system to:

use signals transmitted by an ultrasound transmitter of the device and received at an ultrasound receiver of the device to determine, at intervals, whether or not an object is present within a three-dimensional detection zone adjacent the device, by determining whether or not a set of presence conditions is met;

alter a display screen of the device when the results of two successive such determinations differ; and use signals transmitted by the ultrasound transmitter and received at the ultrasound receiver to detect a movement of an input object, and control a further operation of the device in response to said detection.

The skilled person will appreciate that the invention allows just one ultrasound transmitter and one ultrasound receiver to be used to enable rich interactions with the device, supporting both presence detection and movement detection. This reduces the bill of materials compared with systems that require many transducers, and is amenable to relatively simple processing of the received signals.

In some embodiments, the three-dimensional detection zone may be predetermined or fixed, e.g. being determined by one or more features on the electronic device or one or more features parameters stored in a memory of the electronic device, or it may be set adaptively by the electronic device.

The set of presence conditions may consist of one or more presence conditions. It may be fixed or it may be set adaptively by the electronic device. Each presence condition may be determined, at least in part, by a parameter which is stored in a memory of the electronic device (e.g., a parameter which determines a threshold time value for a presence condition); the value of such a parameter may be fixed (e.g., by the manufacturer) or it may be variable and the electronic device may be configured to set its value based on an input to the device or on some other condition.

In some embodiments, the set of presence conditions comprises one or more of (i) receiving a reflection of an ultrasound signal transmitted by the ultrasound transmitter within a threshold maximum time after transmission of the signal; (ii) receiving a reflection of an ultrasound signal transmitted by the ultrasound transmitter after a threshold minimum time from transmission of the signal; and (iii) receiving a reflection of an ultrasound signal transmitted by the ultrasound transmitter having at least a threshold minimum signal strength.

In some embodiments, altering the display screen comprises dimming or deactivating the display screen when an object is determined to be within the detection zone, and brightening or activating the display screen when no object is determined to be within the detection zone; the object may, for instance, be a human ear or head. The input object may be the same object, or it may be a different object.

In some embodiments, detecting a movement comprises detecting one or more of: a tap movement, a double-tap movement, a continuous movement towards the device, or a continuous movement away from the device.

In some embodiments, the device is configured to transmit a continuous signal, such as a sine wave, from the ultrasound transmitter. Movement of the input object may be detected by identifying a change in frequency within a received reflection of the continuous signal, reflected off the input object and received at the ultrasound receiver. Movement of the input object towards or away from the device will create a change in frequency in the reflected signals, due to the Doppler effect. While Doppler shift detection cannot easily be used to find the distance between the device and the input object, the applicant has found that Doppler shifts are useful for detecting fast movements, and can be preferable to analyzing time-of-flight estimations from coded signals. In particular, it can be more reliable, and it can be more computationally efficient. In some embodiments, therefore, movement of the input object is detected without using information relating to time-of-flight of the reflected signals.

The device may calculate the Fourier transform of the received signal; it may do this directly or preferably after down-converting and down-sampling, which can save additional computational cost. The Fourier transform may be used to determine a frequency distribution of the received signals.

The device may be configured to detect a "double-tap" gesture by the input object. It may be configured to do this by analyzing changes in the frequency of a received signal. In particular, it may look for a rise in frequency (signify movement towards the device), following by a fall in frequency (signify movement away from the device), followed by a further rise in frequency (signify movement towards the device again). To reduce the probability of false detections caused by inadvertent movements, the device may require a minimum speed or minimum frequency to be exceeded (e.g., during a rolling time window) before detecting a double-tap gesture. The device may require the gesture to be completed within a maximum time window in order to give a positive detection.

In one set of embodiments, the device is a arranged to take a photograph when a particular movement of the input object (a gesture) is detected. The double-tap gesture has been found to be particularly well suited for this, especially when the user is taking a self-portrait (a "selfie").

In some embodiments, the device comprises no other ultrasound transmitter for transmitting ultrasound signals.

In some embodiments, the device comprises no other ultrasound receiver for receiving ultrasound signals.

In some embodiments, the input object comprises a human hand or digit.

In some embodiments, the transmitted ultrasonic signals comprise pulses or coded signals such as chirps.

In some embodiments, the device is a mobile telephone or a tablet computer.

In some embodiments, the display screen is a touch-screen; e.g. a capacitative touchscreen.

In some embodiments, the ultrasound transmitter is an earpiece speaker suitable for audible sound output, such as for outputting a voice signal during a telephone call.

In some embodiments, the ultrasound transmitter and the ultrasound receiver are the same transducer.

In some embodiments, the ultrasound receiver is a microphone located adjacent or proximate to the ultrasound transmitter; e.g., within 5 mm, 10 mm or 20 mm of each other.

In some embodiments, the ultrasound transmitter and ultrasound receiver are situated behind a common opening in a face of the device, such as an aperture in a sheet of glass covering the display screen.

In some embodiments, said operation of the device may comprise revealing different information or touch overlays on the display screen.

In some embodiments, said operation of the device may comprise revealing different layers of information and control as the input object is moved towards the device from greater than a threshold distance away (e.g. from greater than 50 cm away).

In some embodiments, said operation of the device may comprise changing a display on the display screen as the input object moves progressively towards or away from the display screen or device. The display screen may change continuously as the distance (linear or round-trip time-of-flight) to the input object changes, or it may undergo a series of discrete changes as the distance to the input object passes a respective series of thresholds.

In some embodiments, the transmitter and receiver have greater forward sensitivity and lesser off-axis or lateral sensitivity.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which:

FIG. 2 is a schematic of functional blocks within the mobile phone; and

FIG. 3 is a graph of frequency against time for a received reflection signal.

Figure 1:
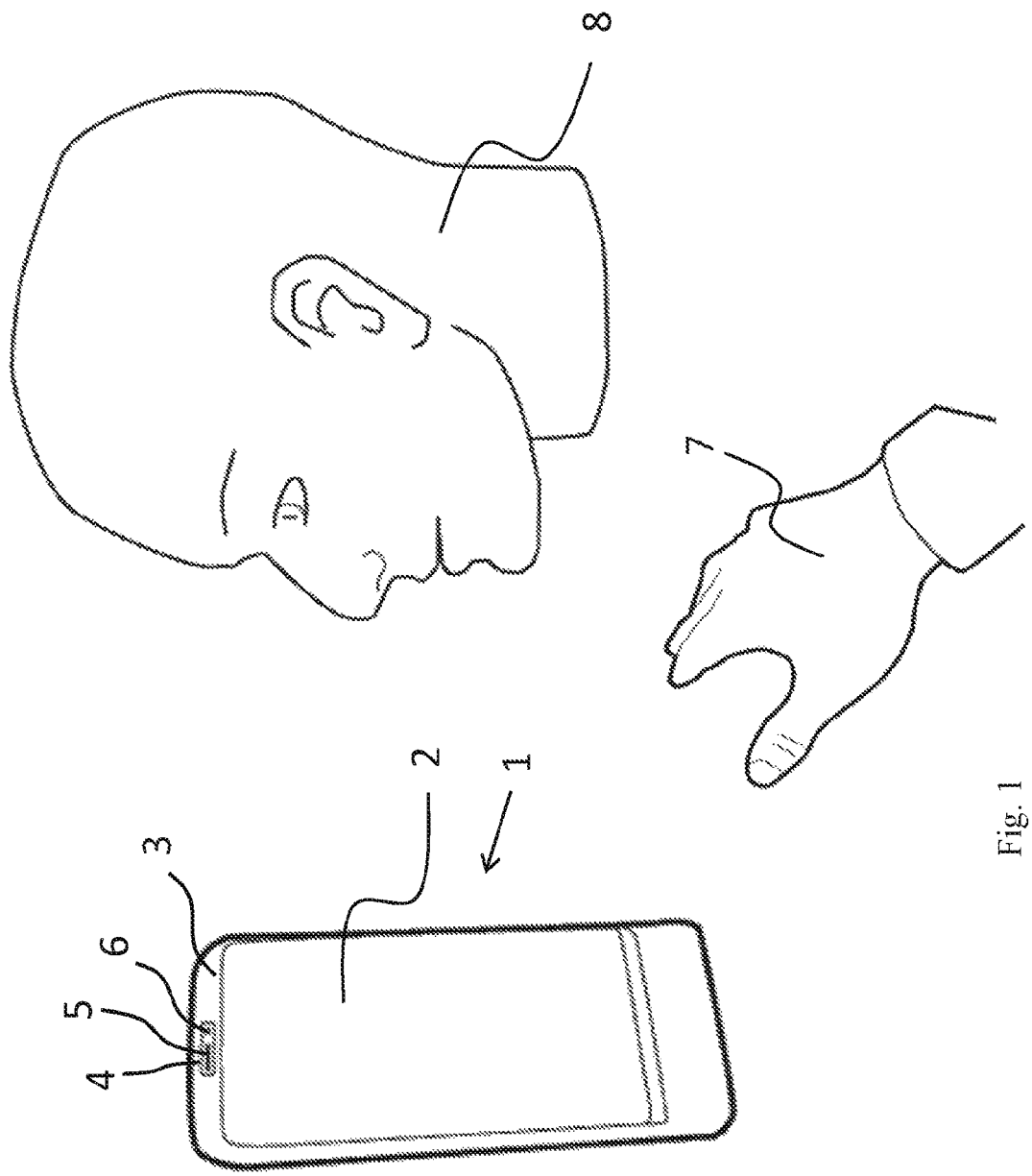
FIG. 1 is a drawing of a mobile phone embodying the invention and a human user.

The reader is referred to the above-referenced earlier patent applications by the applicant for implementation details that are conventional. The present description will therefore concentrate on those details that are new and peculiar to the present invention.

FIG. 1 shows a mobile phone 1 which has a touch-enabled display screen 2 covered by a sheet of glass 3. An aperture 4 in the glass allows sound to emanate from a loudspeaker 5, and to reach a microphone 6, which are mounted below the glass.

The loudspeaker 5 is able to generate audible and ultrasonic sounds. The microphone 6 can receive ultrasonic signals.

A processing system within the phone 1 (not shown), which may include one or more DSPs, CPUs, microcontrollers, memory, etc., causes ultrasonic chirps to be emitted at intervals from the loudspeaker 5. These may reflect off a user's hand 7 and be received by the microphone 6. The sampled, received signals are processed by the processing system, and used to control the phone 1 in dependence on movement of the user's hand 7.

Additionally, if more than a threshold level of energy is reflected back to the microphone 6, from a reflector within a threshold maximum time-of-flight distance, such as when the phone 1 is brought to within a few centimeters of the side of the user's head 8, the processing system causes the touch input mechanism of the display screen 2 to be deactivated. It may also turn off the backlight of the display screen 2.

More generally, an acoustic ultrasound transmitter and receiver located near to one another on a device such as a mobile phone or a tablet can be used to detect the distance to an echoic object in front of a device. The transmitter can for instance be the already existing earpiece speaker and a microphone can be located within the same opening in the cover glass as the transmitter. The transmitter sends out a pulse or a coded signal such as a chirp, and the time delay until the echo of this signal is received in the microphone is used to calculate the distance to the echo object. The strength of the echo can also be used to give extra information about the size or distance to the object.

This system can be used as a replacement for the existing proximity sensor that is used to turn off the screen illumination and touch screen functionality while the phone is held close to the ear during a phone conversation. The screen is then turned off when the distance to the object is below a certain limit, and turned on again when the distance is above another limit.

The same unit can be used for touchless control of the unit giving input commands such as a tap, a double-tap, etc. or continuous movement towards and away from the unit. One particular use case is when the unit is hand held that the thumb is moved in an out over the sensor location to reveal different information or touch overlays on the screen. This can be combined with touch operations, typically using the other hand for touch.

Another similar use case is to reveal different layers of information and control as the hand is moved forward towards the unit from a longer distance, for instance up to half a meter. When the unit is hand held it is beneficial that the transmitter and receiver are most sensitive in the forward direction, and thus less sensitive to the gripping fingers and other items to the sides of the unit such as the body or a table.

Operation at even longer distances can be relevant when the unit is lying flat on the table or docked in a stand.

The processing system may also cause a continuous sine wave to be emitted from the loudspeaker 5, at a different time from the chirps, or on a different frequency. This sine signal may also reflect off the user's hand 7 and be received by the microphone 6. The sampled, received signals are processed by the processing system, and used to control the phone 1 in dependence on movement of the user's hand 7. In particular, the received signals may be analyzed for one or more particular patterns of frequency shifts, indicative of a respective type of gesture. The mobile phone 1 may respond to a detected gesture in an appropriate way (e.g., starting an application, waking from sleep, or taking a photograph).

For a static input object the frequency of the transmit and return signals are identical, but when the input object is moving there will be a shift in frequency proportional to the speed of the object relative to the mobile device 1. The frequency or Doppler shift of the reflected signal is approximately $\Delta f = 2 f_0 \cdot v/c$, where $f_0$ is the frequency of the transmitted signal, v is the speed of the reflector towards the speaker 5 and microphone 6, and c is the speed of sound in air. A positive shift in frequency therefore indicates a movement towards the device 1, while a negative shift indicates a movement away from the device 1.

The frequency distribution is computed by taking the Fourier transform of the received signal after down-converting and down-sampling.

In one implementation, illustrated in FIG. 2, a reflected signal is received at the microphone 6. This may have been transmitted at a frequency of 30 kHz. The received signal is fed to an analogue-to-digital (ADC) converter 10, which samples at 96 kHz. The ADC 10 outputs to a down-mixer 11 and a low-pass filter (LPF) and decimator block 12, which down-convert the received signal to complex baseband and down-sample by a factor of forty. The maximum observable frequency shift is then 1.2 kHz, which translates into a speed of approximately 3 m/s. A fast Fourier transform (FFT) block 13 then computes the Fourier transform on blocks of 60 samples, which correspond to an observation window of 25 ms per frequency estimate. The functional blocks shown in FIG. 2 may be implemented in hardware, in software, or in a combination of both.

FIG. 3 shows a trajectory in the time-frequency plane resulting from a double-tap movement of the user's hand 7 in the direction of the mobile device 1. The hand 7 is first moved toward the device 1 causing positive shifts in frequency, then back causing negative shifts, and finally towards the device 1 again causing positive shifts. A double-tap gesture can therefore be detected by monitoring Doppler shift patterns alone—e.g. using conventional pattern-matching techniques. To reduce the probability of false detections caused by inadvertent movements it can be required that a minimum speed or frequency should be surpassed. A minimum relative speed towards the device 1 is indicated by the upper dashed line in FIG. 3, while a minimum relative speed away from the device is indicated by the lower dashed line. A double-tap may be detected simply by looking for a suitable pattern of crossings of these thresholds (towards-away-towards) within a maximum time window, or more sophisticated pattern-matching could be used. In one embodiment, a double-tap motion causes the mobile device 1 to take a photograph using a camera (not shown) on the device 1.

The invention claimed is:

1. An electronic device comprising an ultrasound transmitter, an ultrasound receiver, a display screen, and a processing system, wherein the device is configured to:
   transmit ultrasonic signals from the ultrasound transmitter;
   receive ultrasound signals, through air, at the ultrasound receiver;
   use signals transmitted by the ultrasound transmitter and received at the ultrasound receiver to determine, at intervals, whether or not an object is present within a three-dimensional detection zone adjacent the device, by determining whether or not a set of presence conditions is met;
   alter the display screen when the results of two successive such determinations differ; and
   use signals transmitted by the ultrasound transmitter and received at the ultrasound receiver to detect a movement of an input object, and control a further operation of the device in response to said detection.

2. The electronic device of claim 1, wherein the set of presence conditions comprises one or more of (i) receiving a reflection of an ultrasound signal transmitted by the ultrasound transmitter within a threshold maximum time after transmission of the signal; (ii) receiving a reflection of an ultrasound signal transmitted by the ultrasound transmitter after a threshold minimum time from transmission of the signal; and (iii) receiving a reflection of an ultrasound signal transmitted by the ultrasound transmitter having at least a threshold minimum signal strength.

3. The electronic device of claim 1, wherein altering the display screen comprises dimming or deactivating the display screen when an object is determined to be within the detection zone, and brightening or activating the display screen when no object is determined to be within the detection zone.

4. The electronic device of claim 1, configured to detect one or more of: a tap movement, a double-tap movement, a continuous movement towards the device, or a continuous movement away from the device.

5. The electronic device of claim 1, configured to transmit a continuous signal from the ultrasound transmitter and to detect movement of the input object by identifying a change in frequency within a received reflection of the continuous signal, reflected off the input object and received at the ultrasound receiver.

6. The electronic device of claim 1, configured to take a photograph on detecting a double-tap movement of the input object.

7. The electronic device of claim 1, configured to transmit ultrasonic pulses or coded signals.

8. The electronic device of claim 1, wherein the ultrasound transmitter is an earpiece speaker suitable for audible sound output.

9. The electronic device of claim 1, wherein the ultrasound transmitter and ultrasound receiver are situated behind a common opening in a face of the electronic device.

10. The electronic device of claim 1, wherein said further operation comprises revealing different information or touch overlays on the display screen.

11. The electronic device of claim 1, wherein said further operation comprises changing a display on the display screen as the input object moves progressively towards or away from the display screen or the electronic device.

12. A method comprising:
transmitting ultrasonic signals from an ultrasound transmitter;
receiving ultrasound signals, through air, at an ultrasound receiver;
using signals transmitted by the ultrasound transmitter and received at the ultrasound receiver to determine, at intervals, whether or not an object is present within a three-dimensional detection zone, by determining whether or not a set of presence conditions is met;
altering a display screen when the results of two successive such determinations differ; and
using signals transmitted by the ultrasound transmitter and received at the ultrasound receiver to detect a movement of an input object, and performing a further operation in response to said detection.

13. The method of claim 12, wherein the set of presence conditions comprises one or more of (i) receiving a reflection of an ultrasound signal transmitted by the ultrasound transmitter within a threshold maximum time after transmission of the signal; (ii) receiving a reflection of an ultrasound signal transmitted by the ultrasound transmitter after a threshold minimum time from transmission of the signal; and (iii) receiving a reflection of an ultrasound signal transmitted by the ultrasound transmitter having at least a threshold minimum signal strength.

14. The method of claim 12, wherein altering the display screen comprises dimming or deactivating the display screen when an object is determined to be within the detection zone, and brightening or activating the display screen when no object is determined to be within the detection zone.

15. The method of claim 12, comprising detecting one or more of: a tap movement, a double-tap movement, a continuous movement towards the device, or a continuous movement away from the device.

16. The method of claim 12, comprising transmitting a continuous signal from the ultrasound transmitter and detecting movement of the input object by identifying a change in frequency within a received reflection of the continuous signal, reflected off the input object and received at the ultrasound receiver.

17. The method of claim 12, wherein said further operation comprises revealing different information or touch overlays on the display screen.

18. The method of claim 12, wherein the object is a human ear or head.

19. The method of claim 12, wherein the input object comprises a human hand or digit.

20. A non-transitory computer-readable medium comprising instructions which, when executed on a processing system in an electronic device, cause the processing system to:
use signals transmitted by an ultrasound transmitter of the electronic device and received at an ultrasound receiver of the electronic device to determine, at intervals, whether or not an object is present within a three-dimensional detection zone adjacent the electronic device, by determining whether or not a set of presence conditions is met;
alter a display screen of the electronic device when the results of two successive such determinations differ; and
use signals transmitted by the ultrasound transmitter and received at the ultrasound receiver to detect a movement of an input object, and control a further operation of the electronic device in response to said detection.

* * * * *